US007162079B2

(12) United States Patent
Tamagawa

(10) Patent No.: US 7,162,079 B2
(45) Date of Patent: Jan. 9, 2007

(54) COLOR CONVERSION DEFINITION CORRECTING METHOD, COLOR CONVERSION DEFINITION CORRECTING APPARATUS, AND COLOR CONVERSION DEFINITION CORRECTING PROGRAM STORAGE MEDIUM

(75) Inventor: Kiyomi Tamagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 633 days.

(21) Appl. No.: 10/365,467

(22) Filed: Feb. 13, 2003

(65) Prior Publication Data
US 2003/0165267 A1 Sep. 4, 2003

(30) Foreign Application Priority Data
Mar. 1, 2002 (JP) .............................. 2002-055379
Sep. 11, 2002 (JP) .............................. 2002-265669

(51) Int. Cl.
*G06K 9/00* (2006.01)
(52) U.S. Cl. ...................................... 382/167; 382/162
(58) Field of Classification Search ................ 382/162, 382/167; 358/1.9, 1.16, 406, 504, 518; 345/207, 345/204, 593; 101/23; 430/358, 359
See application file for complete search history.

(56) References Cited

U.S. PATENT DOCUMENTS

| 5,933,578 A | * | 8/1999 | Van de Capelle et al. ... 358/1.9 |
| 6,043,909 A | * | 3/2000 | Holub ........................ 358/504 |
| 6,157,735 A | * | 12/2000 | Holub ........................ 382/167 |

FOREIGN PATENT DOCUMENTS

| JP | 2001-45313 | 2/2001 |
| JP | 2002-142126 | 5/2002 |

* cited by examiner

*Primary Examiner*—Anh Hong Do
(74) *Attorney, Agent, or Firm*—Sughrue Mion, PLLC

(57) ABSTRACT

In a color conversion definition correcting method, image data for a target device is converted into image data for an output device using a color conversion definition made by combining a profile for a target device with a profile for an output device, and an image is output according to the converted image data. The profile for the target device is corrected as follows. Coordinate values out of a color gamut for the output device in the calorimetric color space, of coordinate values in a color gamut for the target device in the calorimetric color space, all go in the color gamut for the output device. Likely, calorimetric values for the color chart output from the target device are corrected. The corrected profile for the target device is further corrected according to the calorimetric values after correction and the calorimetric values of the color chart output from the output device.

6 Claims, 11 Drawing Sheets

COLOR CONVERSION DEFINITION CORRECTING METHOD, COLOR CONVERSION DEFINITION CORRECTING APPARATUS, AND COLOR CONVERSION DEFINITION CORRECTING PROGRAM STORAGE MEDIUM

BACKGROUND OF THE INVENTION

1. Field of the Invention

The present invention relates to a color conversion definition correcting method of correcting a color conversion definition, a color conversion definition correcting apparatus for correcting a color conversion definition, and a color conversion definition correcting program storage medium storing therein a color conversion definition correcting program, wherein image data for a target device is converted into image data for an output device using a color conversion definition consisting of a combination of a profile for a target device outputting an image based on image data with a profile for an output device outputting an image based on image data, and an image is outputted in accordance with the image data after the conversion.

2. Description of the Related Art

Hitherto, when a printing machine is used to perform a color image printing, it is performed prior to the color image printing that a color printer and the like is used to create a proof image which is extremely similar in color to an image to be printed in the printing machine. When a printer is used to create the proof image, there is derived a color reproduction characteristic (a printing profile) describing a relation between image data and colors of actual printed matters, associated with a printing machine of interest. And there is also derived a color reproduction characteristic (a printer profile) describing a relation between image data and colors of images actually printed out, associated with the printer. Further there is created a color conversion definition consisting of a combination of the printing profile and the printer profile. The image data for printing is converted into the image data for a printer in accordance with the combined color conversion definition, so that a proof image is created in accordance with the image data for a printer thus converted. In this manner, it is possible to create the proof image, which is coincident with the actual printed matter in color to some extent.

In order to obtain a proof image, which is coincident with the actual printed matter in color, in the manner as mentioned above, there is a need to determine with great accuracy a color reproduction characteristic (a profile) of an output device such as a printing machine and a printer. To determine the color reproduction characteristic (a profile), the profile of the output device is obtained in such a manner that image data corresponding to a color chart in which color patches are arranged is created; the output device outputs the color chart in accordance with the image data; a spectrocolorimeter and the like is used to measure the color chart; and coordinates of a calorimetric color space thus obtained are associated with coordinates of a color space (a device color space) in which the image data is expressed. In this respect, please see Japanese Patent Publication Toku-Kai 2001-45313.

However, even if the color reproduction characteristic (a profile) of the output device such as a printing machine and a printer is carefully obtained in the manner as mentioned above, and image data is converted in accordance with the color conversion definition consisting of a combination of the printing profile and the printer profile, there will occur such a phenomenon that a printed matter is delicately different from a proof image in color owing to various errors and fluctuating main courses.

In this manner, in the event that a printed matter is delicately different from a proof image in color, conceptually, it is possible to consider that those profiles and the color conversion definition are corrected to establish an accurate matching of colors. However, it may happen that it is unclear as to which and how the profiles and the color conversion definition are corrected. Even if it is clear, it would be a hard task to correct the profiles and the color conversion definition by manual work.

SUMMARY OF THE INVENTION

In view of the foregoing, it is an object of the present invention to provide a color conversion definition correcting method of correcting a color conversion definition, a color conversion definition correcting apparatus for correcting a color conversion definition, and a color conversion definition correcting program storage medium storing therein a color conversion definition correcting program, wherein image data representative of an image to be outputted by a target device such as a printing machine and the like is converted into image data for a proofer, and a proof image is outputted by a proofer such as a printer in accordance with the image data after the conversion, which are capable of easily and accurately correcting the color conversion definition.

To achieve the above-mentioned object, the present invention provides a color conversion definition correcting method of correcting a color conversion definition consisting of a combination of a target profile representative of an association between coordinates on a target color space depending on a target device for outputting an image based on image data and coordinates on a calorimetric color space of a device non-dependence with an output profile representative of an association between coordinates on an output device color space depending on an output device for outputting an image based on image data and coordinates on the calorimetric color space, said color conversion definition correcting method comprising:

a target profile correcting step of applying to said target profile such a correction that coordinate values out of a color gamut for said output device in the colorimetric color space, of coordinate values in a color gamut for said target device in the colorimetric color space, all go in the color gamut for said output device;

a first colorimetric step of measuring color patches of a color chart outputted from said target device in accordance with first chart data representative of a color chart in which a plurality of color patches is arranged to obtain first colorimetric data defined by the coordinates on said colorimetric color space;

a second colorimetric step of measuring color patches of a color chart outputted from said output device in accordance with second chart data in which the first chart data is converted in accordance with said color conversion definition to obtain second colorimetric data defined by the coordinates on said colorimetric color space;

a colorimetric data correcting step of applying same correction as the correction in said target profile correcting step to the first colorimetric data obtained in said first colorimetric step; and a definition correcting step of further correcting the color conversion definition in which the target profile is corrected in said target profile correcting step, in accordance with the first colorimetric data corrected in said colorimetric data correcting step and the second colorimetric data obtained in said second colorimetric step.

The "same correction" in the colorimetric data correcting step implies that there is no need of completely same correction and it is acceptable to provide substantially same correction, for example, wherein very little correcting amount, which is substantially unnecessary, is neglected.

Further, as the output device, any one is acceptable, which may reproduce colors of an image in the target device, for example, a proofer specified in order to create a proof image in the printing field, an on-demand printer for producing printed matters upon receipt of an order, and a general color printer other than a printing field.

In the event that a color of an image outputted from the target device is delicately different from a color of an image outputted from the output device, there is considered a method that both the target device and the output device output the same color charts each consisting of a plurality of color patches, and a calorimeter is used to measure the color patches of the outputted color charts to obtain colorimetric values, so that the color conversion definition is corrected to cancel a difference between the colorimetric values.

However, in the event that a color gamut of the target device includes a portion exceeding a color gamut of the output device, it is impossible in principle to reproduce a matched color in the output device as to the exceeding portion. For this reason, even if the color conversion definition is corrected to cancel the difference between the colorimetric values in the exceeding portion, the color reproduction quality is not improved, rather it is expected that the color reproduction becomes worse. As a way to coping with this, there is considered a method of using a color chart consisting of only color patches having colors sufficiently inside the color gamut.

However, in the vicinity of the boundary of the color gamut, there are existing colors, which are deemed as important, such as pure colors of the primary color and the secondary color. Accordingly, there is desired a method of correcting the color conversion definition properly including the vicinity of the boundary.

In view of the foregoing, according to the color conversion definition correcting method of the present invention, prior to correcting the color conversion definition, the target profile correcting step applies correction to the target profile constituting the color conversion definition, and the colorimetric data correcting step applies to the first colorimetric data the same correction as that in the target profile correcting step. As a result, even if the color chart includes the color patches of colors near the boundary of the color gamut, it is possible to correct readily and properly the color conversion definition with great accuracy.

Incidentally, the target profile correcting step is not restricted to one in which only correction for the coordinate values out of the color gamut for the output device is performed, and it is acceptable that the target profile correcting step is one in which correction for the coordinate values in the color gamut for the output device is performed, for the purpose of avoiding discontinuity by the correction for the coordinate values out of the color gamut for the output device.

In the color conversion definition correcting method according to the present invention as mentioned above, it is preferable that the target color space depending on said target device is a color space in which cyan, magenta, yellow and black are given as coordinate axes, said color space being representative of dot percent for four colors of those cyan, magenta, yellow and black, and, said target profile correcting step comprises:

a confirming step of sequentially selecting coordinate points from each of eight vertexes in a color space of a cube-like configuration wherein cyan, magenta and yellow are variables, in which a dot percent of the black in the target device color space is fixed, toward a center of the color space of a cube-like configuration, and confirming as to whether coordinate values on a colorimetric space associated by said target profile with coordinate values represented by the selected coordinate points are out of the color gamut of said output device;

a first correcting amount computing step of computing a correcting amount so that the coordinate values, which are confirmed that the coordinate values are out of the color gamut of said output device, are corrected to all go in the color gamut for said output device;

a second correcting amount computing step of computing correcting amount in coordinate points of a square, said square being parallel to any one of six side faces in the color space of a cube-like configuration where cyan, magenta and yellow are variables, and said square having vertexes wherein the coordinate points selected in said first correcting amount computing step are established as the vertexes in accordance with the correcting amount computed in said first correcting amount computing step; and a correcting step of correcting said target profile in accordance with the correcting amounts computed in said first correcting amount computing step and said second correcting amount computing step.

As a correcting method of the target profile, there is considered a method in which it is confirmed one by one overall a target device color space as to whether coordinate points on the target device color space are out of the color gamut for the output device, and the correction is performed in accordance with the confirmed result. However, this work takes a great deal of time for a confirmation.

In view of the foregoing, it is noticed that the target device color space is considered as a set of cubes where cyan, magenta and yellow are variables, and the coordinate points are searched from eight vertexes of each of the cubes to the center. This feature makes it possible to perform the confirmation taking no great deal of time.

To achieve the above-mentioned object, the present invention provides a color conversion definition correcting apparatus for correcting a color conversion definition consisting of a combination of a target profile representative of an association between coordinates on a target color space depending on a target device for outputting an image based on image data and coordinates on a colorimetric color space of a device non-dependence with an output profile representative of an association between coordinates on an output device color space depending on an output device for outputting an image based on image data and coordinates on the colorimetric color space, said color conversion definition correcting apparatus comprising:

a target profile correcting section for applying to said target profile such a correction that coordinate values out of a color gamut for said output device in the colorimetric color space, of coordinate values in a color gamut for said target device in the colorimetric color space, all go in the color gamut for said output device;

a first colorimetric data obtaining section for measuring color patches of a color chart outputted from said target device in accordance with first chart data representative of a color chart in which a plurality of color patches is arranged to obtain first colorimetric data defined by the coordinates on said colorimetric color space;

a second colorimetric data obtaining section for measuring color patches of a color chart outputted from said output device in accordance with second chart data in which the first chart data is converted in accordance with said color conversion definition to obtain second colorimetric data defined by the coordinates on said colorimetric color space;

a colorimetric data correcting section for applying same correction as the correction in said target profile correcting section to the first colorimetric data obtained in said first colorimetric data obtaining section; and a definition correcting section for further correcting the color conversion definition in which the target profile is corrected in said target profile correcting section, in accordance with the first colorimetric data corrected in said colorimetric data correcting section and the second colorimetric data obtained in said second colorimetric data obtaining section.

To achieve the above-mentioned object, the present invention provides a color conversion definition correcting program storage medium storing a color conversion definition correcting program which causes a computer to operate as a color conversion definition correcting apparatus, when said color conversion definition correcting program is incorporated into the computer and executed, said color conversion definition correcting program correcting a color conversion definition consisting of a combination of a target profile representative of an association between coordinates on a target color space depending on a target device for outputting an image based on image data and coordinates on a colorimetric color space of a device non-dependence with an output profile representative of an association between coordinates on an output device color space depending on an output device for outputting an image based on image data and coordinates on the colorimetric color space, and said color conversion definition correcting program comprising:

a target profile correcting section for applying to said target profile such a correction that coordinate values out of a color gamut for said output device in the colorimetric color space, of coordinate values in a color gamut for said target device in the colorimetric color space, all go in the color gamut for said output device;

a first colorimetric data obtaining section for measuring color patches of a color chart outputted from said target device in accordance with first chart data representative of a color chart in which a plurality of color patches is arranged to obtain first colorimetric data defined by the coordinates on said colorimetric color space;

a second colorimetric data obtaining section for measuring color patches of a color chart outputted from said output device in accordance with second chart data in which the first chart data is converted in accordance with said color conversion definition to obtain second colorimetric data defined by the coordinates on said colorimetric color space;

a colorimetric data correcting section for applying same correction as the correction in said target profile correcting section to the first colorimetric data obtained in said first colorimetric data obtaining section; and a definition correcting section for further correcting the color conversion definition in which the target profile is corrected in said target profile correcting section, in accordance with the first colorimetric data corrected in said colorimetric data correcting section and the second colorimetric data obtained in said second colorimetric data obtaining section.

DETAILED DESCRIPTION OF PREFERRED EMBODIMENTS

Embodiments of the present invention will be described with reference to the accompanying drawings.

Figure 1:
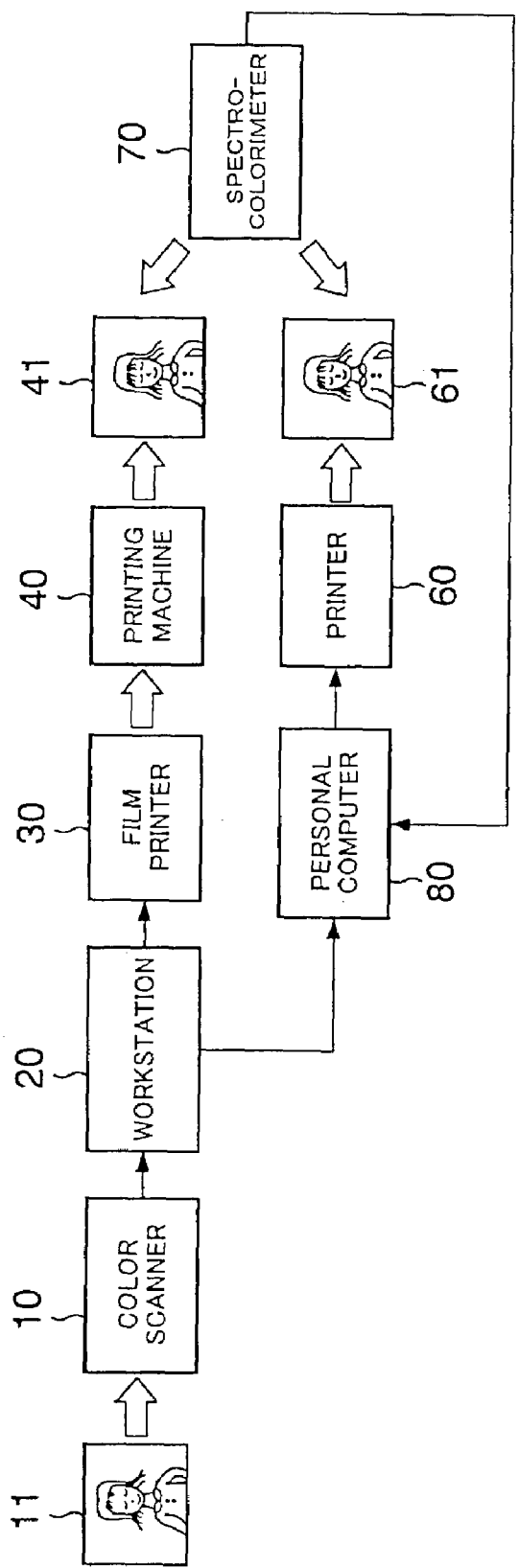
FIG. 1 is a construction view of a printing and proof image creating system to which an embodiment of the present invention is applied.

FIG. 1 is a construction view of a printing and proof image creating system to which an embodiment of the present invention is applied.

A color scanner 10 reads an original image 11 to generate color separation image data for CMYK four colors representative of the original image 11. The color separation image data for CMYK is fed to a workstation 20. In the workstation 20, an operator performs an electronic page make-up in accordance with fed image data to generate image data representative of an image for printing. The image data for printing is fed to a film printer 30 when the printing is performed. The film printer 30 creates film original plates for printing for CMYK in accordance with the fed image data.

From the film original plates for printing, machine plates are created, and the machine plates thus created are loaded onto a printing machine 40. Ink is applied to the machine plates loaded onto the printing machine 40. The applied ink is transferred to a paper for printing to form a printed image 41 on the paper.

A series of work that the film printer 30 is used to create the film original plates, a machine plate is created and is loaded onto the printing machine 40, and ink is applied to the machine plate to perform a printing on a sheet, is a large-scale work, and it costs a great deal. For this reason, prior to the actual printing work, a printer 60 is used to create a proof image 61 in accordance with a manner as set forth below, so that finish of the printed image 41 is confirmed beforehand. The film printer 30 and the printing machine 40 constitute an example of the target device referred to in the present invention. The printer 60 corresponds to an example of the output device referred to in the present invention.

When the proof image 61 is created, the image data, which is created by the electronic page make-up on the workstation 20, is fed to a personal computer 80. Here, the image data fed to the personal computer 80 is description language data described in a so-called PDL (Page Description Language). In the personal computer 80, a so-called RIP (Raster Image Processor) is used to convert the received image data into image data for CMYK four colors developed into a bit map. The image data for CMYK four colors is substantially same as the image data for printing fed to the film printer 30.

The image data for CMYK four colors for printing is converted into image data for CMYK four colors suitable for the printer 60, while a color conversion definition having a format of LUT (Look Up Table) is referred to in the personal computer 80. The printer 60 receives the image data for CMYK four colors for the printer to create a proof image 61 in accordance with the received image data for CMYK four colors for the printer.

A degree of color matching between the image 41 obtained through printing by the printing machine 40 and the proof image 61 obtained by the printer 60 is determined by the color conversion definition in the personal computer 80.

While FIG. 1 shows only one printing machine, it is acceptable that a plurality of printing machines exist, and alternatively it is acceptable that while only one printing machine, a plurality of printing conditions exist. The color conversion definition is created in accordance with a plurality of printing conditions including a difference in type of printers. A spectrocolorimeter 70 and the personal computer 80 are associated with creation of the color conversion definition.

Confirmation of the proof image thus created makes it possible to confirm finish of printing beforehand.

A feature of the embodiment of the present invention in the printing and proof image creating system shown in FIG. 1 relates to processing contents to be executed in the personal computer 80. Accordingly, hereinafter, there will be explained the personal computer 80.

Figure 2:
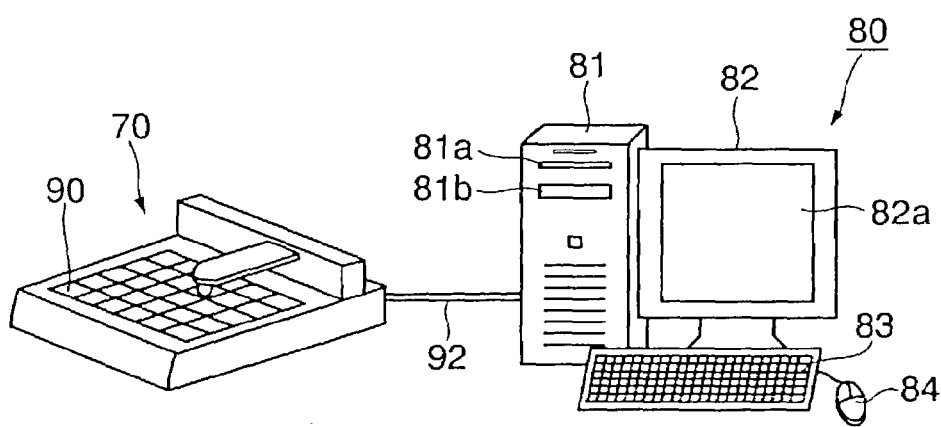
FIG. 2 is a perspective view of the spectrocolorimeter and the personal computer shown in FIG. 1.
Figure 3:
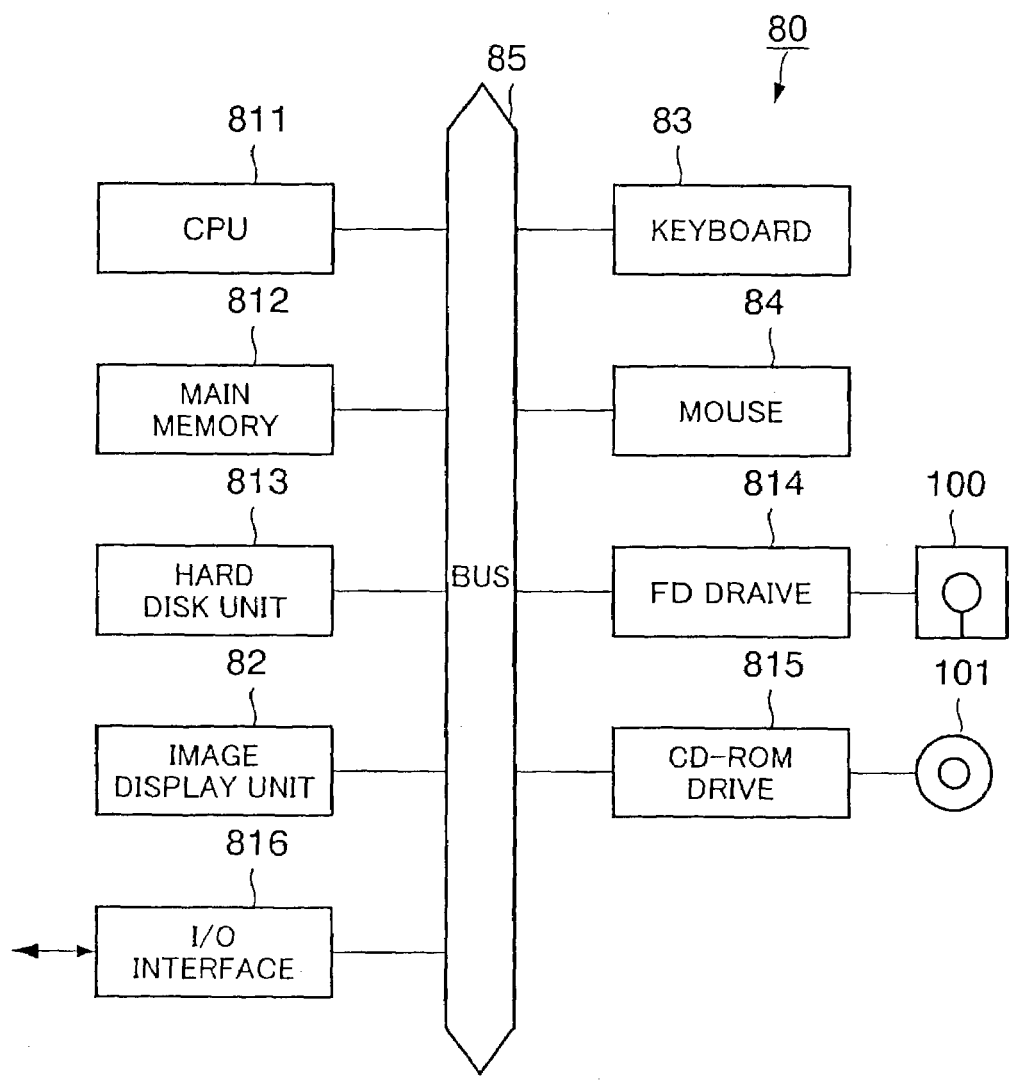
FIG. 3 is a hardware structural view of the personal computer.
Figure 4:
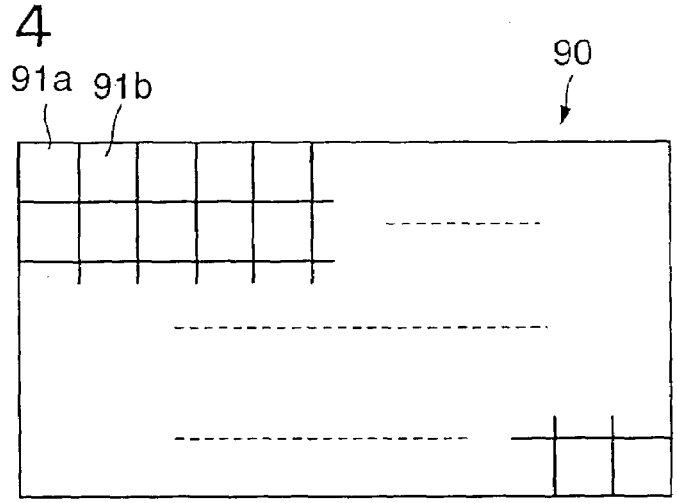
FIG. 4 is a typical illustration of a color chart.

FIG. 2 is a perspective view of the spectrocolorimeter 70 and the personal computer 80 shown in FIG. 1. FIG. 3 is a hardware structural view of the personal computer 80. FIG. 4 is a typical illustration of a color chart.

The spectrocolorimeter 70 shown in FIG. 2 is loaded with a color chart 90 in which a plurality of color patches 91*a*, 91*b*, . . . , as shown in FIG. 4, so that colorimetric values (XYZ values) on the plurality of color patches 91*a*, 91*b*, are measured. Colorimetric data representative of the colorimetric values of the color patches obtained through measurement by the spectrocolorimeter 70 is fed via a cable 92 to the personal computer 80.

The color chart 90 is created by printing with the printing machine 40 shown in FIG. 1, or by printing output with the printer 60. The personal computer 80 recognizes color data (coordinates on a device color space: values for CMYK) associated with the color patches constructing the color chart 90, and creates a printing profile and a printer profile in accordance with color data for the respective color patches of the color chart 90 and the colorimetric data obtained by the spectrocolorimeter 70. Details of this respect will be explained later. Next, there will be explained a hardware structure of the personal computer 80.

The personal computer 80 comprises, on an external appearance, a main frame unit 81, an image display unit 82 for displaying an image on a display screen 82*a* in accordance with an instruction from the main frame unit 81, a keyboard 83 for inputting various sorts of information to the main frame unit 81 in accordance with a key operation, and a mouse 84 for inputting an instruction according to, for example, an icon and the like, through designation of an optional position on the display screen 82*a*, the icon and the like being displayed on the position on the display screen 82*a*. The main frame unit 81 has a floppy (registered trademark) disk mounting slot 81*a* for mounting a floppy (registered trademark) disk, and a CD-ROM mounting slot 81*b* for mounting a CD-ROM.

The main frame unit 81 comprises, as shown in FIG. 3, a CPU 811 for executing a various types of program, a main memory 812 in which a program stored in a hard disk unit 813 is read out and developed for execution by the CPU 811, the hard disk unit 813 for saving various types of programs and data, an FD drive 814 for accessing a floppy (registered trademark) disk 100 mounted thereon, a CD-ROM drive 815 for accessing a CD-ROM 101 mounted thereon, and an I/O interface 816 connected to the spectrocolorimeter 70 (cf. FIG. 1 and FIG. 2) to receive colorimetric values from the spectrocolorimeter 70. These various types of elements are connected via a bus 85 to the image display unit 82, the keyboard 83 and the mouse 84.

The CD-ROM 101 stores therein a profile creating program that causes the personal computer 80 to create a profile. The CD-ROM 101 is mounted on the CD-ROM drive 815 so that the profile creating program, which is stored in the CD-ROM 101, is up-loaded on the personal computer 80 and is stored in the hard disk unit 813.

Next, there will be explained a method of creating a profile in the personal computer 80.

First, there will be explained a method of creating a printing profile.

In the workstation 20 shown in FIG. 1, dot % data for CMYK four colors, sequentially varied, for example, at intervals of 0%, 10%, . . . , 100%, is generated, and the color chart 90 (cf. FIG. 4) based on dot % data thus generated is created in accordance with the above-mentioned printing procedure. While the image 41 shown in FIG. 1 is not representative of the color chart, the spectrocolorimeter 70 is used to measure the color patches 91*a*, 91*b*, . . . , which constitute the color chart 90, assuming that instead of the image 41, the color chart 90 shown in FIG. 4 is printed. Thus, there is constructed a printing profile representative of the association coordinates on a color space for CMYK four colors and coordinates on a colorimetric color space.

Figure 5:
FIG. 5 is a conceptual view of a printing profile.

FIG. 5 is a conceptual view of a printing profile.

The printing profile shown in FIG. 5 receives image data defined by CMYK (an example of the target device color space referred to in the present invention) to convert the received image data for CMYK into image data defined by XYZ (an example of the colorimetric color space referred to in the present invention).

Next, there will be explained a method of creating a printer profile.

Incidentally, here, it is assumed that the printer profile is created by a maker of the printer and is delivered together with the printer. Accordingly, here, while there is no need to create newly the printer profile, hereinafter, there will be explained a basic creating method in the event that the printer profile is created newly.

A method of creating the printer profile is the same as a method of creating the printing profile excepting that an output device for outputting a color chart is a printer but not a printing machine. That is, here, the personal computer 80 shown in FIG. 1 is used to generate dot % data for CMYK four colors, sequentially varied, for example, at intervals of 0%, 10%, ..., 100%. The dot % data thus generated is transmitted to the printer 60. The printer 60 prints out a color chart in accordance with the dot %. Incidentally, it is acceptable that the dot % sequentially varies at intervals of that other than 10%. For the sake of convenience, however, it is assumed that dot % data of intervals of 10% is used.

While the image 61 shown in FIG. 1 is not an image representative of a color chart, it is assumed that the printer 60 outputs the same type of color chart as the color chart created through printing by the printing machine 40 for the purpose of creation of the printing profile, for instance, instead of the image 61, and the spectrocolorimeter 70 is used to measure the color patches of the color chart. Thus, there is constructed a printer profile representative of the association between coordinates values on a color space (an example of the proofer color space referred to in the present invention) for CMYK four colors and coordinates values on a colorimetric color space (the XYZ space), with respect to the printer 60.

Figure 6:
FIG. 6 is a conceptual view of a printer profile.

FIG. 6 is a conceptual view of a printer profile.

The printer profile shown in FIG. 6 receives dot % data for CMYK to convert the received dot % data for CMYK into colorimetric data for XYZ. Here, the printer profile for converting the dot % data for CMYK into the colorimetric data for XYZ is denoted by P, and reversely, the printer profile for converting the colorimetric data for XYZ into the dot % data for CMYK is denoted by $P^{-1}$.

While it is explained that the printer 60 outputs an image in accordance with the dot % data for CMYK, also with respect to a printer for outputting an image according to data for RGB for instance, it is likely possible to create a printer profile suitable for the printer in such a manner that the personal computer 80 is used to generate data defined with an RGB space, and outputs a color chart.

Here, however, there will be explained the present embodiment wherein there is used the printer 60 for outputting an image in accordance with the dot % data for CMYK.

Figure 7:
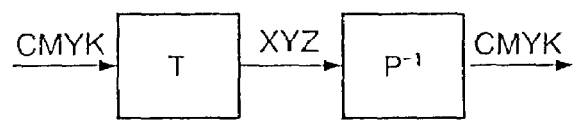
FIG. 7 is a view of a combined profile in which a printing profile is combined with a printer profile.

FIG. 7 is a view of a combined profile in which a printing profile is combined with a printer profile.

The combined profile shown in FIG. 7 converts dot % data for CMYK for printing into colorimetric data for XYZ in accordance with a printing profile T, and then converts the colorimetric data for XYZ into dot % data for CMYK for printer in accordance with a printer profile $P^{-1}$. Thus, the use of the printer 60 makes it possible to output a proof image having the same color as the printing in accordance with the dot % data for CMYK for printer. The combined profile, which consists of a combination of the printing profile T and the printer profile $P^{-1}$, converts the image data defined with the CMYK color space for printing into the image data defined with the CMYK color space for a printer. The combined profile is a correction object in an embodiment of a color conversion definition correcting method of the present invention, which will be explained after. It is noted, however, that according to the embodiment of a color conversion definition correcting method of the present invention, correction of the printing profile constituting the combined profile substantially corrects the combined profile.

After the personal computer 80, which constitutes the printing and proof image creating system, as shown in FIG. 1, is used to create the color conversion definition (the combined profile) and convert the image data described in the PDL fed from the workstation 20 into image data for CMYK, the image data for CMYK is converted into image data for CMYK for a printer using the color conversion definition or the combined profile, and the printer 60 is used to print out an image in accordance with the image data for CMYK for a printer, so that a proof image to the image for printing is created.

Even if a color conversion definition is created in the manner as mentioned above, and the color conversion definition is used to convert image data for printing entered from the workstation into image data for a printer so that a proof image is created in accordance with the converted image data for a printer, it may happen that a color of the proof image is not completely coincident with a color on a printed matter when the printed matter is created in accordance with the image data for printing, and has an error. As one of the causes, there is considered the following matter. While it was explained that the printer profile has been created basically in accordance with the above-mentioned procedure at a maker side of the printer, the printer profile created by the maker side is not one by the delivered printer itself, and is one created using an original machine of a printer determined by the maker side. Thus, it is considered that there is some instrumental error between the original machine of a printer and the delivered printer. It is considered that the causes of the discordance in color of the proof image reside in not only the above-mentioned cause but also a set of various error main causes in process of creation of the printing profile and other various main causes.

In view of the foregoing, in the event that a degree of matching in color of the proof image is unsatisfactory, it is considered to correct a color conversion definition in order to establish a coincidence of color with greater accuracy.

However, there is such a case where a color gamut of the printing machine includes a portion that is out of a color gamut of a printer. It is impossible in principle to reproduce a color of the portion on a proof image.

Figure 8:
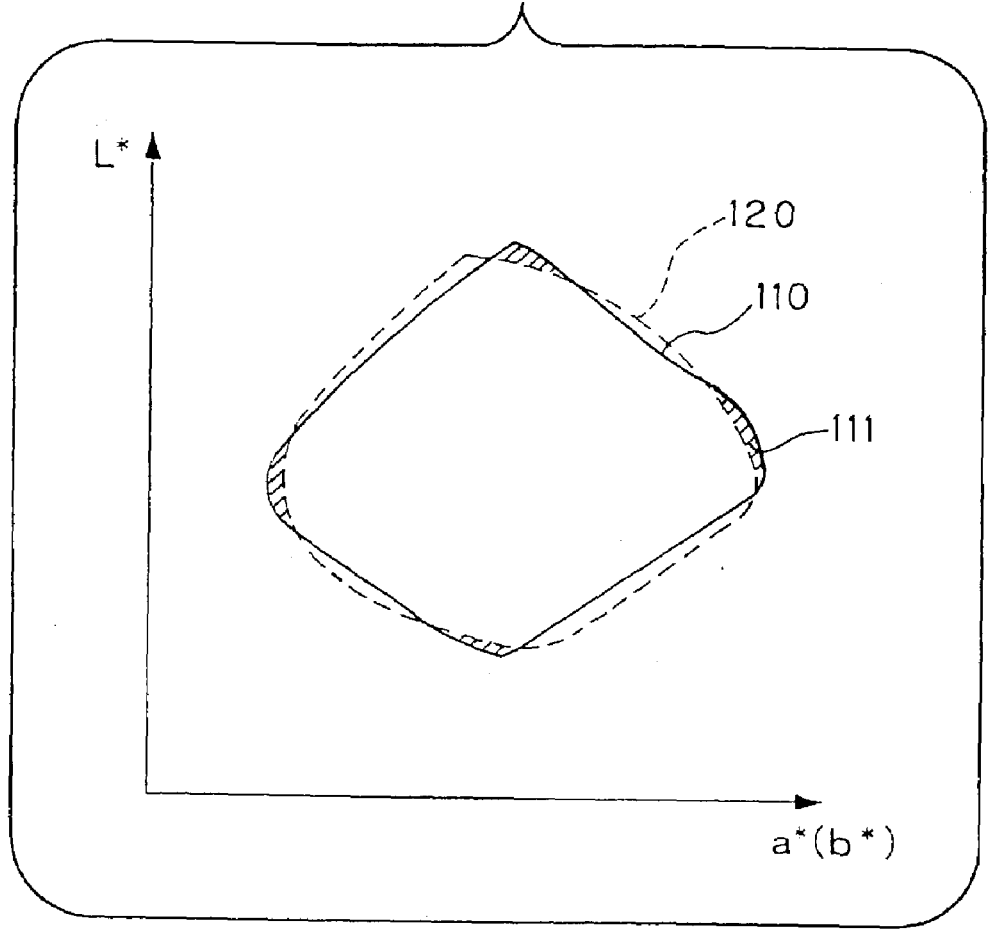
FIG. 8 is a view showing, by way of example, color reproduction areas (color gamut) of a printing image and a proof image.

FIG. 8 is a view showing, by way of example, color reproduction areas (color gamut) of a printing image and a proof image.

FIG. 8 shows a colorimetric space (a Lab space) defined by L*a*b* values. The horizontal axis of the figure denotes a* axis and b* axis, and the vertical axis denotes L* axis. This Lab space is an example of the colorimetric space, which is obtained by coordinate conversion from the XYZ space.

FIG. 8 shows a color gamut 110 of a printing machine in the Lab space with the solid line, and also a color gamut 120 of a printer with the broken line. The Lab space is easier than the XYZ space in sensually grasping a color space. Accordingly, while the color gamut will be explained using the Lab space, the color gamut is to be understood also in the XYZ space in a similar fashion to that of the Lab space.

While a printer for outputting a proof image is designed in such a way that the color gamut 120 is close to the color gamut 110 of the printing machine as much as possible, there is such a case where the color gamut 110 of the printing machine includes portions 111 exceeding the color gamut 120 of the printer. It is impossible to reproduce a color included in the portions 111 by the printer. When the color conversion definition is corrected unreasonably to reproduce a color included in the portions 111 by the printer, it is anticipated that reproduction quality of a color in the vicinity of the boundary of the color reproduction areas 110 and 120 will get worse instead of doing.

In the vicinity of the boundary of the color reproduction areas 110 and 120, however, there exists a color close to the saturated colors of the primary color and the secondary color, and such a color is important for printing. Thus, it is desired to establish a color reproduction with great accuracy as much as possible.

In view of the foregoing, hereinafter, there will be explained an embodiment of a color conversion definition correcting method according to the present invention, which is capable of avoiding troublesomeness in the vicinity of the boundary of the color reproduction areas and also correcting the color conversion definition.

The CD-ROM 101 shown in FIG. 2 stores therein also a color conversion definition correcting program for correcting the color conversion definition by the personal computer 80. The color conversion definition correcting program is up loaded onto the personal computer 80 so as to be stored in the hard disk unit 813. When the color conversion definition correcting program is executed, the personal computer 80 serves as a color conversion definition correcting apparatus for correcting a color conversion definition in accordance with a color conversion definition correcting method which will be described later.

According to the color conversion definition correcting method of the present embodiment, first, applied to the printing profile T constituting the combined profile shown in FIG. 7 is such a correction that the portions 111 exceeding the color gamut 120 for the printer of the color gamut 110 of the printing machine shown in FIG. 8 all go in the color gamut 120 for the printer.

Figure 9:
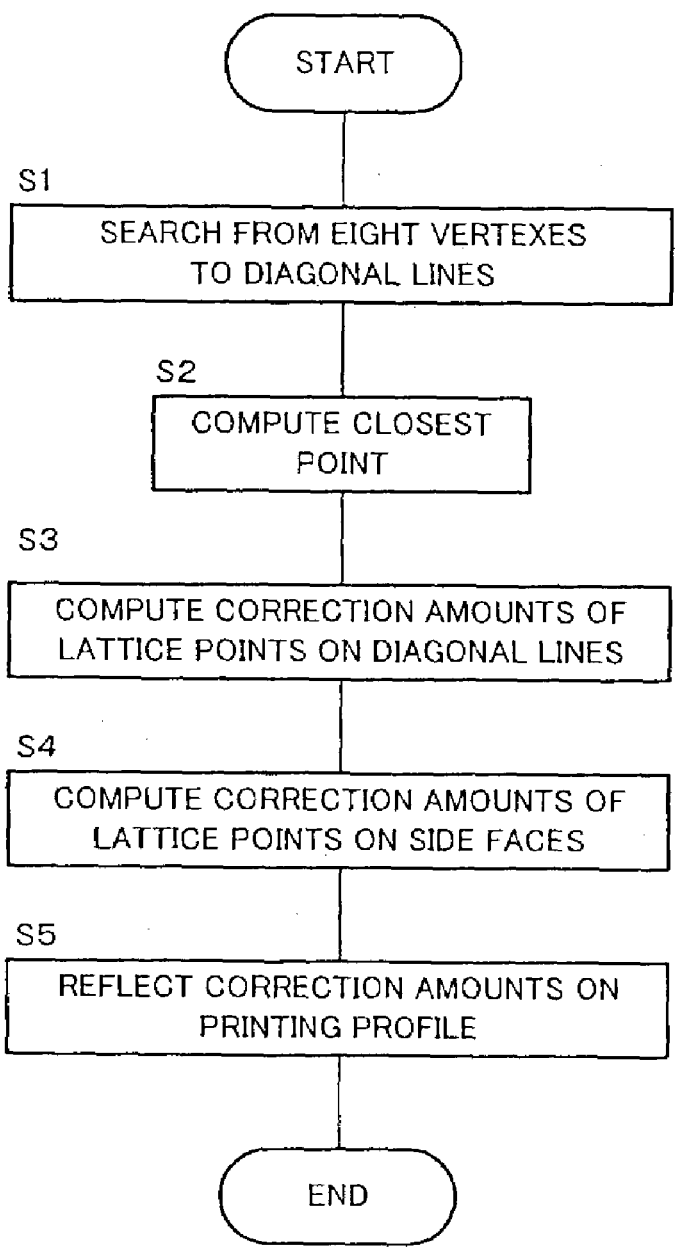
FIG. 9 is a flowchart useful for understanding correction of the printing profile.

FIG. 9 is a flowchart useful for understanding correction of the printing profile.

In this correction, first, with respect to dot % data for a K-plate in CMYK color space for describing dot % data of CMYK for printing, dot % data sequentially varied as for example, 0%, 10%, . . . , 100%, are set up, and there is determined a cube-like configuration of CMY color space wherein CMY three colors are variables, in which K-plates are fixed on a series of dot % data thus set up, respectively. A set of the CMY color spaces thus determined is equivalent to the CMYK color space.

Figure 10:
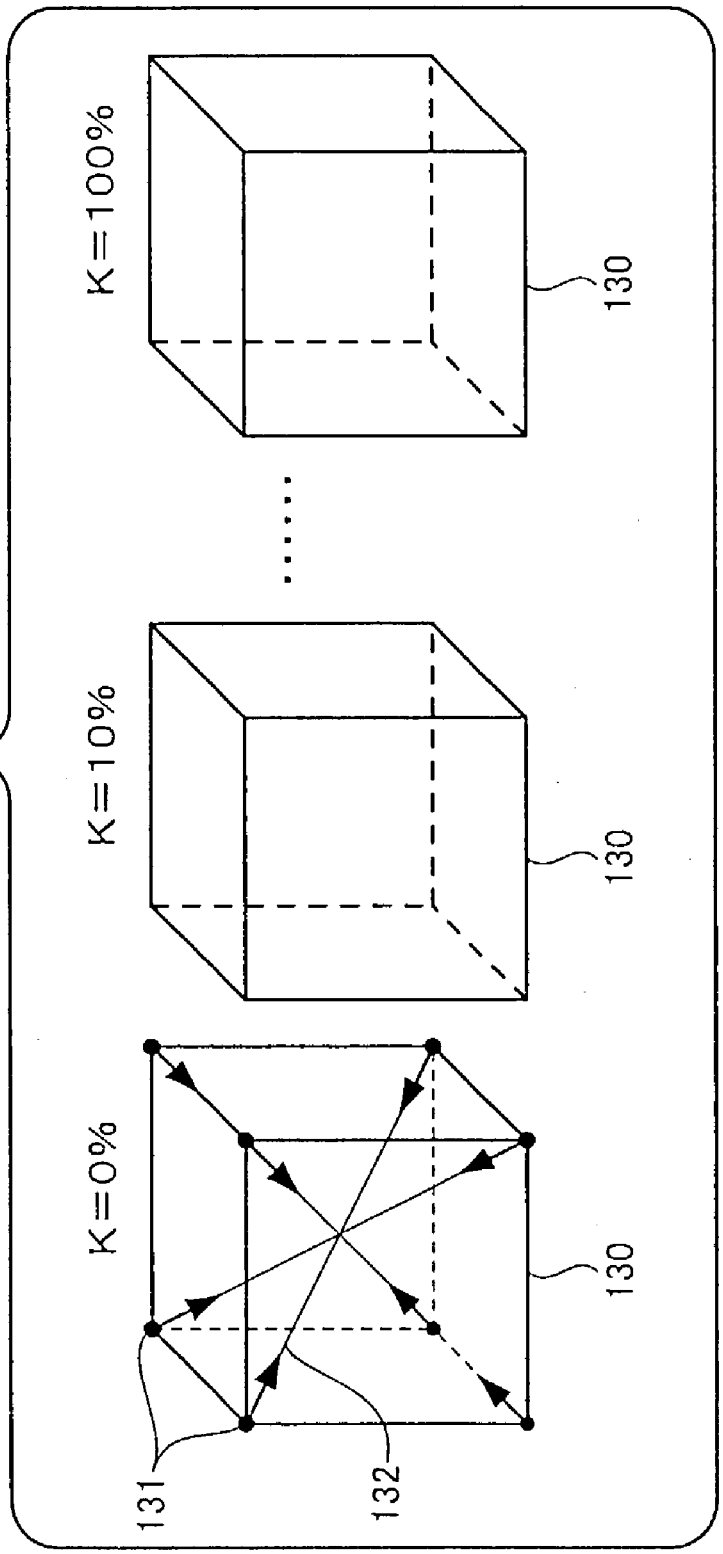
FIG. 10 is an illustration showing a series of color space wherein K-plates are fixed on a series of dot % data, respectively.

FIG. 10 is an illustration showing a series of color space wherein K-plates are fixed on a series of dot % data, respectively.

FIG. 10 shows cube-like configuration of CMY color spaces 130, wherein dot % data of K-plates are fixed on a series of dot % data such as 0%, 10%, . . . , 100%, respectively.

With respect to each of the CMY color spaces 130, eight vertexes 131 are selected, and it is confirmed as to whether colorimetric values (XYZ values), which are associated by the printing profile with coordinate values for the CMYK color space corresponding to the selected vertex 131, exist within the color gamut of a printer. When it is confirmed that the colorimetric values are concerned with colorimetric values out of the color gamut of a printer, there is selected the next point approaching from the vertex 131 to the center of the CMY color space 130, of the points existing on a diagonal line 132. And with respect to the colorimetric values associated with the selected point, the same confirmation is carried out.

Such selection and confirmation operation is sequentially repeated on each of the eight vertexes 131 from the individual vertex 131 toward the center of the CMY color space 130. And the selection and confirmation operation is terminated at the time reaching the color gamut of a printer (step S1 in FIG. 9).

In the correction show in FIG. 9, next, of the colorimetric values confirmed as being out of the color gamut of a printer, with respect to the colorimetric values associated with the above-mentioned eight vertexes, there are determined colorimetric values in which the color difference from the former colorimetric values is smallest in the color gamut of a printer (step S2). And there is computed a correction amount for colorimetric values confirmed as being out of the color gamut of a printer by confirmation of the step S1 (step S3).

Figure 11:
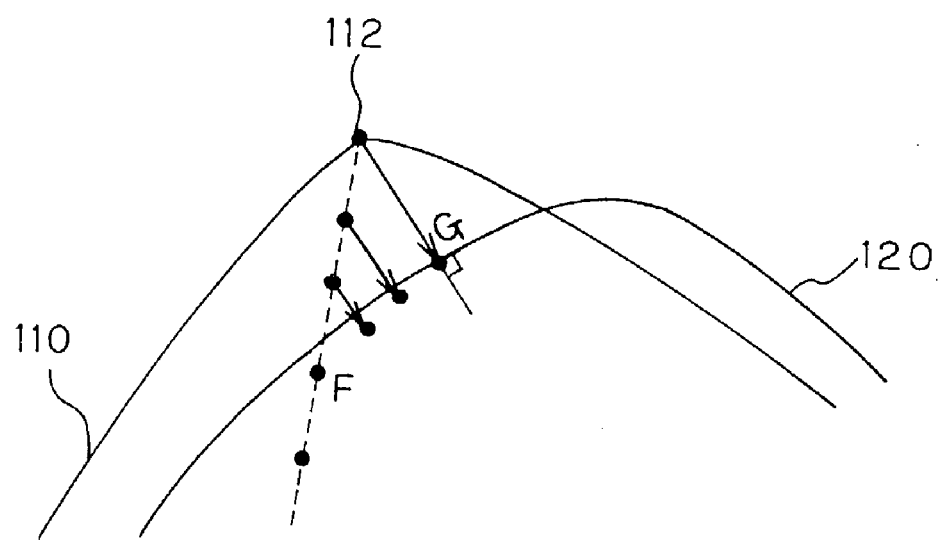
FIG. 11 is a view in which a part of the color gamut shown in FIG. 8 is enlarged.

FIG. 11 is a view in which a part of the color gamut shown in FIG. 8 is enlarged.

FIG. 11 shows a portion, wherein the color gamut 110 of a printing machine exceeds the color gamut 120 of a printer, is enlarged.

FIG. 11 shows a point 112 on the Lab space, which is equivalent to XYZ values associated with the vertex 131 shown in FIG. 10. The point 112 exists on the boundary of the gamut 110 of a printing machine. Points on the broken line subsequent to the point 112 associated with the points on the diagonal lines 132 shown in FIG. 10, respectively. A point F denotes a point reaching the color gamut 120 of a printer.

FIG. 11 further shows a point G in the color gamut 120 of a printer, which is closest to the point 112 associated with the vertex 131. In the step S3 in FIG. 9, there are determined, as shown with the arrows, correction amounts, in which points between the point 112 and the point F are translated to points between the point G and the point F, respectively. It is acceptable that the points between the point G and the point F are points which are located at positions wherein for example, a distance between the point G and the point F is divided at even intervals, or alternatively, wherein a distance between the point G and the point F is divided at the same interval ratio as the interval ration of the points between the point 112 and the point F. Such correction amounts are more preferable when they are determined on the Lab space rather than the XYZ space.

When the correction amounts are computed in the step S3 in FIG. 9 in the manner as mentioned above, next, there are computed correction amounts for colorimetric values associated with points existing on side faces of the cube 130 shown in FIG. 10 and faces parallel to the side faces (step S4).

Figure 12:
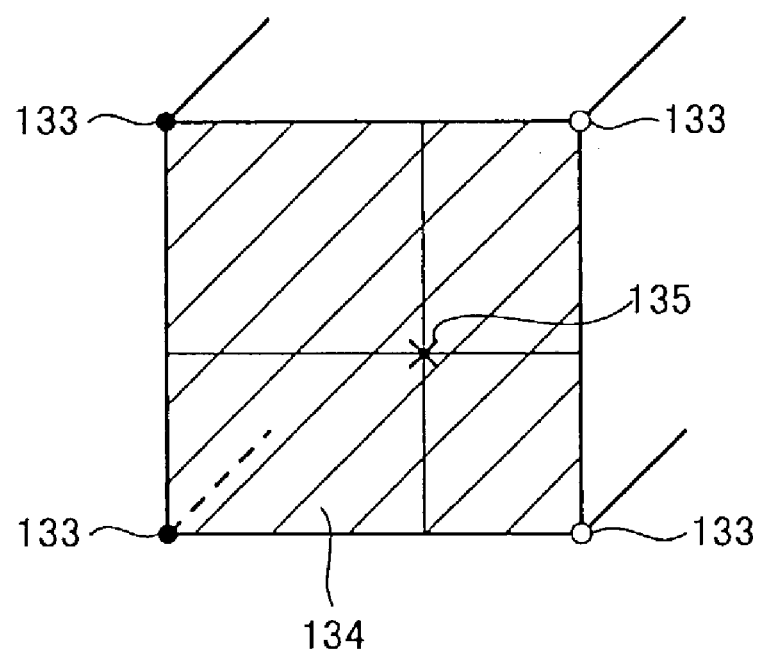
FIG. 12 is a view showing an example of a surface parallel to a side face of a cube shown in FIG. 10.

FIG. 12 is a view showing an example of a surface parallel to a side face of a cube shown in FIG. 10.

FIG. 12 shows a face 134 of a square having four vertexes 133. Those four vertexes 133 exist on the diagonal line 132 shown in FIG. 10. Vertexes 133 denoted by the black dot are points wherein a correction value to the associated colorimetric value is not 0, and vertexes 133 denoted by the white dot are points wherein a correction value to the associated colorimetric value is 0. A face 134 of the square shown in FIG. 12 is parallel to the side face of the cube 130 shown in FIG. 10. In other words, it may be considered that the face 134 of the square shown in FIG. 12 is a side face of a cube existing as nesting inside the cube 130 shown in FIG. 10.

The correction amount for the colorimetric value associated with the point 135 existing on the face 134 of the square is determined in accordance with the interpolation computation based on correction amounts on the four vertexes 133 and the position of the point 135 on the face 134 of the square.

Thus, when the correction amounts for the colorimetric values associated with the points on the face 134 are computed in the step S4 in FIG. 9, the printing profile T shown in FIG. 7 is corrected in accordance with the correction amounts computed in the steps S3 and S4 (step S5 in FIG. 9). However, in, the steps S3 and S4, the correction amounts are determined in form of the Lab values. Accordingly, those correction amounts are converted into XYZ values and then added to XYZ values wherein the output of the printing profile T is defined, so that the printing profile T is corrected.

Further correction, which will be described hereinafter, is applied to the printing profile T thus corrected. Incidentally, the correction amounts used in correction of the printing profile T are saved in order to utilize in the correction, which will be described hereinafter.

Figure 13:
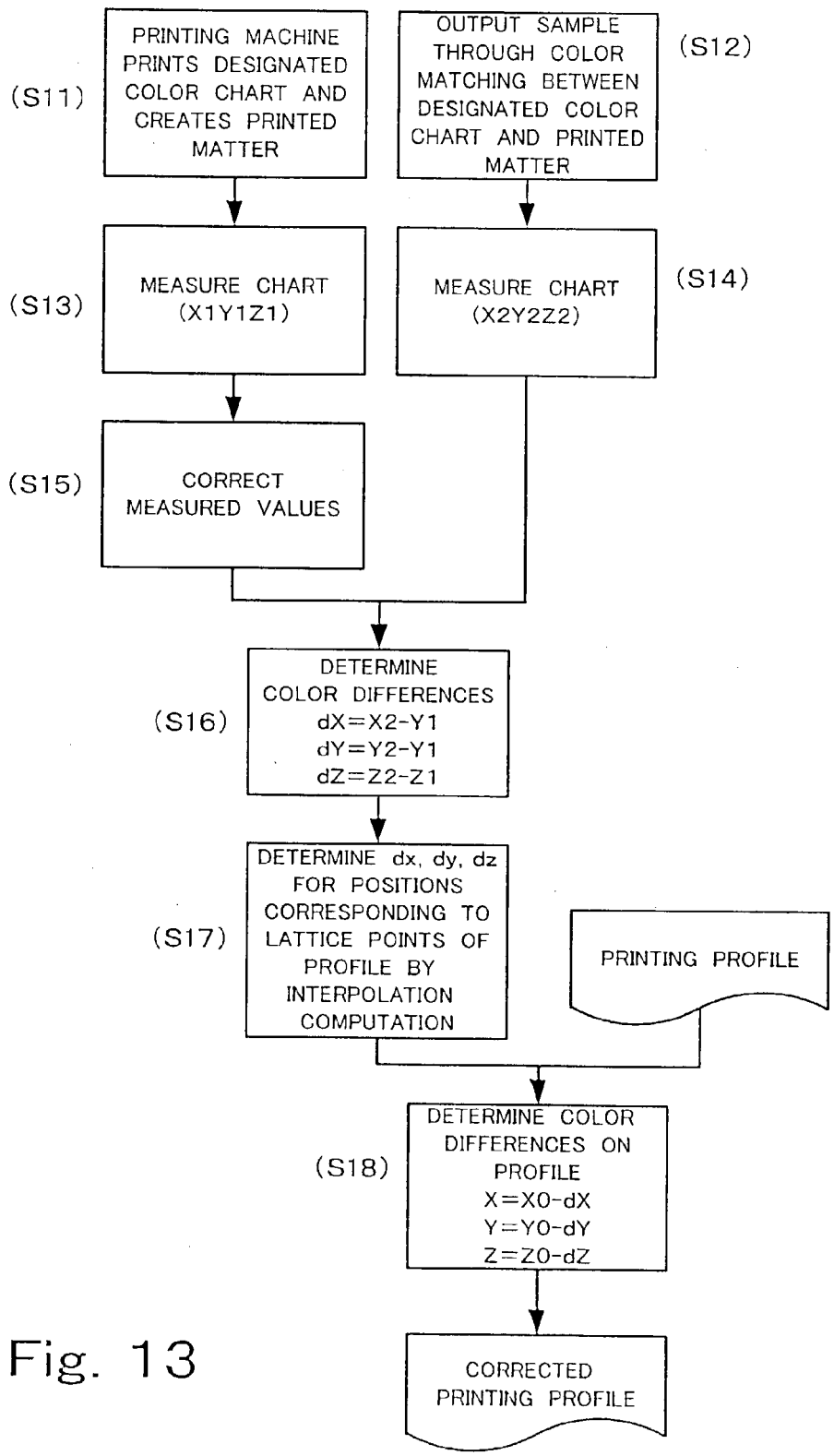
FIG. 13 is a flowchart useful for understanding a method of computing an amount of correction for a colorimetric value associated with a point on a surface.

FIG. 13 is a flowchart useful for understanding a correction of the printing profile T.

In this correction, a color chart for correction is used. It is desired that the color chart for correction is generally a color chart different from the color chart 90 shown in FIG. 4. However, here, for the sake of the convenience for the explanation, it is assumed that the color chart 90 shown in FIG. 4 is used as the color chart for correction. Further, it is assumed that the color chart 90 used as the color chart for correction is provided with color patches for a color important when correction, which exist in the vicinity of the boundary of the color gamut of a printer.

In the correction shown in FIG. 13, first, the printing machine 40 is used to print the color chart 90 to create a printed matter wherein the color chart 90 is printed (step S11), and as explained referring to FIG. 2, XYZ values (X1, Y1, Z1) are measured on each of a plurality of color patches 90a, 90b, . . . , which constitute the color chart 90 (step S13). The measured result is fed to the personal computer 80.

Chart data representative of the color chart 90 is converted into chart data for a printer in accordance with the color conversion definition associated with the object of correction, and the printer 60 is used to output a color chart represented by the chart data for a printer (step S12), so that XYZ values (X2, Y2, Z2) are measured on each of the color patches, in a similar fashion to that of the color chart obtained in the printing machine 40 (step S14). The measured XYZ values (X2, Y2, Z2) are also fed to the personal computer 80.

When the personal computer 80 receives measured data (X1, Y1, Z1) and (X2, Y2, Z2), which are related to the color chart obtained by the printing machine and the color chart obtained by the printer, respectively, the personal computer 80 applies the same correction as the correction shown in FIG. 9 to the measured data (X1, Y1, Z1) related to the color chart obtained by the printing machine (step S15). According to the present embodiment, the CMYK values of the color patches associated with the measured data (X1, Y1, Z1) are known. Therefore, of the correction amounts determined in the correction in FIG. 9, the correction amounts associated with the CMYK values are obtained. In the event that the correction amounts exceed a predetermined amount 6, the correction amounts are added to the measured data (X1, Y1, Z1). Thus, the measured data (X1, Y1, Z1), which exists out of the color gamut of a printer, is within the color gamut of a printer.

Thereafter, the following arithmetic processing is carried out using the measured data (X1, Y1, Z1) after the correction and the measured data (X2, Y2, Z2) for XYZ relating to the color chart obtained in a printer.

First, a difference between both the measured data is determined, so that the color difference therebetween is determined (step S16).

$$dX=X2-X1$$
$$dY=Y2-Y1$$
$$dZ=Z2-Z1 \quad (1)$$

Where (X1, Y1, Z1) and (X2, Y2, Z2) representatively denote colorimetric data for the color patches of the color charts. The operation for the equation (1) is carried out for each pair of associated color patches between the color chart obtained in the printing machine and the color chart obtained in the printer.

Next, there are determined color differences dX, dY and dZ for points in the colorimetric color space corresponding to lattice points of dot % 0%, 10%, 20%, 100%, of the CMYK color space for printing, in accordance with the interpolation computation based on the arithmetic result of the equation (1) (step S17).

Next, the corrected printing profile is referred to in the manner as mentioned above. This printing profile shows the association between coordinate values (CMYK values) of lattice points wherein dot % on each color of CMYK is expressed by 0%, 10%, 20%, . . . , 100%, of the CMYK color space, and coordinate values (XYZ values) of the XY color space. Here, with respect to the respective lattice points of the CMYK color space, the color differences (dX, dY, dZ) associated with the lattice points determined in the step S17 are added (step S18).

$$X=X0-dX$$
$$Y=Y0-dY$$
$$Z=Z0-dZ \quad (2)$$

Wherein (X0, Y0, Z0) typically represent coordinate values of the XYZ color space associated with lattice points of the CMYK color space, of the printing profile before the correction.

With respect to the lattice points, performing the arithmetic operation of the equation (2) makes it possible to correct the printing profile in its entirety.

In the event that instead of the printing profile before the correction, thus created corrected printing profile is adopted, and a color conversion definition (a combined profile), wherein the corrected printing profile is combined with the printer profile used when the correction is carried out, is adopted to perform a color matching, it is possible to obtain a proof image which is matched in color with greater accuracy as compared with before correction. That is, applying the modification and the correction to the printing profile constituting the combined profile makes it possible to perform the substantial correction for the combined profile.

Incidentally, according to the correction shown in FIG. 13, only the printing profile, of the printer profile and the printing profile, is corrected. The reason why it is to do so is as follows. If the printer profile is corrected, this correction may include the correction as to the error factors of the printing machine side. And thus when it is intended that the same printer be used as a proofer for another printing machine (or another printing condition for the same printing machine), a combined profile, wherein the printing profile for another printing machine (or another printing condition for the same printing machine) is combined with the corrected printer profile, may include also the error component of the printing machine used when the printer profile was corrected before. However, when the printer is used as a proofer related to only one printing condition of some one printing machine, it is acceptable that the printer profile is corrected instead of a correction of the printing profile.

Alternatively, it is acceptable that the definition correction step and the definition correction section in the present invention do not correct either profile of the printing profile and the printer profile, and creates the conversion definition for correction associated with the arithmetic operation shown in equation (2), that is, a correcting conversion definition for converting (X0, Y0, Z0) into (X=X0+dX, Y=Y0+dY, Z=Z0+dZ), the XYZ color space, and when the color matching is implemented, there is adopted a color conversion definition in which three items of the printing profile, the correcting conversion definition, and the printer profile are combined with one another.

All the aspects as mentioned above are included in the aspect "correcting the color conversion definition" referred to in the present invention.

According to the above-mentioned embodiments of the present invention, both the printing machine and the proofer output and measure the color chart in accordance with the chart data. According to the present invention, however, it is acceptable that colorimetric data associated with the color chart outputted from the printing machine is computed in accordance with the printing profile before the correction shown in FIG. 9.

Further, according to the above-mentioned embodiments of the present invention, a correction is made wherein colorimetric values (coordinates), which are confirmed as being out of the color gamut of a printer, are subjects. However, according to the present invention, it is acceptable that discontinuity involved in the correction is avoided in such a way that for example, a predetermined area portion is provided within a color gamut of a proofer, and with respect to coordinates out of the predetermined area portion, those coordinates are intended for corrections.

Furthermore, according to the above-mentioned embodiments of the present invention, there is exemplarily shown a system in which a printed image by a printing machine is reproduced by a proof image by a printer. However, any one such as a color printer is acceptable, which is an output device being a target of color reproduction, as the target device referred to in the present invention. And any one, such as a proofer specified for creation of a proof image, an on-demand printer for producing printed matters upon receipt of an order, and a general color printer other than a printing field, is acceptable, which reproduces colors of the target device, as the output device referred to in the present invention.

Figure 14:
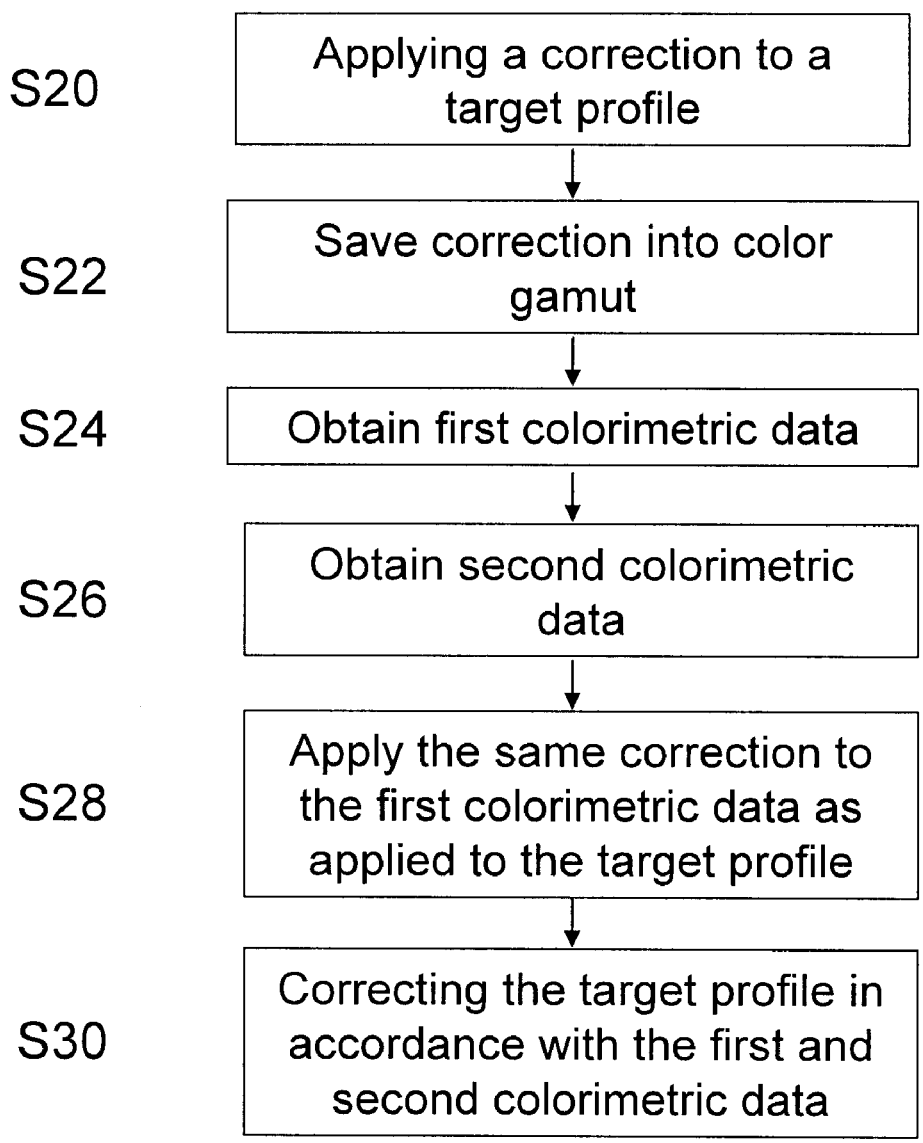
FIG. 14 is a flowchart useful for understanding a method of correcting a color conversion definition.

FIG. 14 is a flowchart useful for understanding a method of correcting a color conversion definition.

In this correction, a target profile undergoes a correcting process as shown in operations S1–S5 in FIG. 9 (S20). The correction to the target profile is then saved in the color gamut for later use (S22). Next, first colorimetric data is obtained as described with respect to operation S13 of FIG. 13 (S24). Second colorimetric data is then obtained in a similar manner to operation S14 of FIG. 13 (S26). The correction to the target profile saved in operation S22 is then applied to the first colorimetric data in operation (S28). Finally, the target profile is corrected in accordance the first colorimetric data obtained in operation S24 and the second colorimetric data obtained in operation S26 (S30).

As mentioned above, according to the present invention, it is possible to easily correct a color conversion definition with great accuracy.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion definition correcting method of correcting a color conversion definition consisting of a combination of a target profile representative of an association between coordinates on a target color space depending on a target device for outputting an image based on image data and coordinates on a colorimetric color space of a device non-dependence with an output profile representative of an association between coordinates on an output device color space depending on an output device for outputting an image based on image data and coordinates on the colorimetric color space, said color conversion definition correcting method comprising:

a target profile correcting step of applying to said target profile such a correction that coordinate values out of a color gamut for said output device in the colorimetric color space, of coordinate values in a color gamut for said target device in the colorimetric color space, all go in the color gamut for said output device;

a first colorimetric step of measuring color patches of a color chart outputted from said target device in accordance with first chart data representative of a color chart in which a plurality of color patches is arranged to obtain first colorimetric data defined by the coordinates on said colorimetric color space;

a second colorimetric step of measuring color patches of a color chart outputted from said output device in accordance with second chart data in which the first chart data is converted in accordance with said color conversion definition to obtain second colorimetric data defined by the coordinates on said colorimetric color space;

a colorimetric data correcting step of applying same correction as the correction in said target profile correcting step to the first colorimetric data obtained in said first colorimetric step; and a definition correcting step of further correcting the color conversion definition in which the target profile is corrected in said target profile correcting step, in accordance with the first colorimetric data corrected in said first colorimetric data correcting step and the second colorimetric data obtained in said second colorimetric step.

2. A color conversion definition correcting method according to claim 1, wherein the target color space depending on said target device is a color space in which cyan, magenta, yellow and black are given as coordinate axes, said color space being representative of dot percent for four colors of those cyan, magenta, yellow and black, and, said target profile correcting step comprises:

a confirming step of sequentially selecting coordinate points from each of eight vertexes in a color space of a cube-like configuration wherein cyan, magenta and yellow are variables, in which a dot percent of the black in the target device color space is fixed, toward a center of the color space of a cube-like configuration, and confirming as to whether coordinate values on a colorimetric space associated by said target profile with coordinate values represented by the selected coordinate points are out of the color gamut of said output device;

a first correcting amount computing step of computing a correcting amount so that the coordinate values, which are confirmed that the coordinate values are out of the color gamut of said output device, are corrected to all go in the color gamut for said output device;

a second correcting amount computing step of computing correcting amount in coordinate points of a square, said square being parallel to any one of six side faces in the color space of a cube-like configuration where cyan, magenta and yellow are variables, and said square having vertexes wherein the coordinate points selected in said first correcting amount computing step are established as the vertexes in accordance with the correcting amount computed in said first correcting amount computing step; and a correcting step of correcting said target profile in accordance with the correcting amounts computed in said first correcting amount computing step and said second correcting amount computing step.

3. The color conversion definition correcting method according to claim 1, further comprising outputting an image in accordance with the image data following color conversion definition correction, wherein the image data represents an image to be outputted by an output device.

4. The method of claim 3, wherein the output device comprises at least one of a printer and monitor display.

5. A color conversion definition correcting apparatus for correcting a color conversion definition consisting of a combination of a target profile representative of an association between coordinates on a target color space depending on a target device for outputting an image based on image data and coordinates on a colorimetric color space of a device non-dependence with an output profile representative of an association between coordinates on an output device color space depending on an output device for outputting an image based on image data and coordinates on the colorimetric color space, said color conversion definition correcting apparatus comprising:

a target profile correcting section for applying to said target profile such a correction that coordinate values out of a color gamut for said output device in the colorimetric color space, of coordinate values in a color gamut for said target device in the colorimetric color space, all go in the color gamut for said output device;

a first colorimetric data obtaining section for measuring color patches of a color chart outputted from said target device in accordance with first chart data representative of a color chart in which a plurality of color patches is arranged to obtain first colorimetric data defined by the coordinates on said colorimetric color space;

a second colorimetric data obtaining section for measuring color patches of a color chart outputted from said output device in accordance with second chart data in which the first chart data is converted in accordance with said color conversion definition to obtain second colorimetric data defined by the coordinates on said colorimetric color space;

a colorimetric data correcting section for applying same correction as the correction in said target profile correcting section to the first colorimetric data obtained in said first colorimetric data obtaining section; and a definition correcting section for further correcting the color conversion definition in which the target profile is corrected in said target profile correcting section, in accordance with the first colorimetric data corrected in said colorimetric data correcting section and the second colorimetric data obtained in said second colorimetric data obtaining section.

6. A computer readable medium on which is recorded a color conversion definition correcting program which causes a computer to operate as a color conversion definition correcting apparatus, when said color conversion definition correcting program is incorporated into the computer and executed, said color conversion definition correcting program correcting a color conversion definition consisting of a combination of a target profile representative of an association between coordinates on a target color space depending on a target device for outputting an image based on image data and coordinates on a colorimetric color space of a device non-dependence with an output profile representative of an association between coordinates on an output device color space depending on an output device for outputting an image based on image data and coordinates on the colorimetric color space, and said color conversion definition correcting program comprising:

a target profile correcting section for applying to said target profile such a correction that coordinate values out of a color gamut for said output device in the colorimetric color space, of coordinate values in a color gamut for said target device in the colorimetric color space, all go in the color gamut for said output device;

a first colorimetric data obtaining section for measuring color patches of a color chart outputted from said target device in accordance with first chart data representative of a color chart in which a plurality of color patches is arranged to obtain first colorimetric data defined by the coordinates on said colorimetric color space;

a second colorimetric data obtaining section for measuring color patches of a color chart outputted from said output device in accordance with second chart data in which the first chart data is converted in accordance with said color conversion definition to obtain second colorimetric data defined by the coordinates on said colorimetric color space;

a colorimetric data correcting section for applying same correction as the correction in said target profile correcting section to the first colorimetric data obtained in said first colorimetric data obtaining section; and a definition correcting section for further correcting the color conversion definition in which the target profile is corrected in said target profile correcting section, in accordance with the first colorimetric data corrected in said colorimetric data correcting section and the second colorimetric data obtained in said second colorimetric data obtaining section.

* * * * *